United States Patent [19]

Sano

[11] Patent Number: 4,769,597
[45] Date of Patent: Sep. 6, 1988

[54] APPARATUS FOR GENERATING INDEX SIGNALS, FOR USE IN MAGNETIC RECORDING/REPRODUCING APPARATUSES

[75] Inventor: Masaki Sano, Fuji, Japan

[73] Assignee: Kabushiki Kaisha Toshiba, Kawasaki, Japan

[21] Appl. No.: 878,245

[22] Filed: Jun. 25, 1986

[30] Foreign Application Priority Data

Jun. 28, 1985 [JP] Japan ................................ 60-142129
Sep. 30, 1985 [JP] Japan ................................ 60-216426

[51] Int. Cl.$^4$ ...................... G01B 7/30; H03K 5/153; H03K 5/22; G11B 15/00
[52] U.S. Cl. .................................. 324/208; 307/358; 324/102; 324/225; 328/110
[58] Field of Search ................... 324/103 P, 163, 173, 324/174, 207, 208, 225, 251; 307/351, 358, 362; 328/110, 117, 146, 147; 360/69, 71, 72.1, 73, 74.4, 75

[56] References Cited

U.S. PATENT DOCUMENTS

| | | | |
|---|---|---|---|
| 2,973,430 | 2/1961 | Pelino | 324/174 X |
| 3,524,075 | 8/1970 | Matthews et al. | 307/358 X |
| 3,801,830 | 4/1974 | Goyer | 324/174 X |
| 4,166,977 | 9/1979 | Glavert et al. | 324/208 X |
| 4,431,916 | 2/1984 | Couch | 307/358 X |
| 4,535,289 | 8/1985 | Abe et al. | 324/208 |
| 4,609,869 | 9/1986 | Metcalf | 324/208 |
| 4,694,200 | 9/1987 | Hetyei | 307/358 |

FOREIGN PATENT DOCUMENTS 0000615 1/1984 Japan ................................ 324/208

Primary Examiner—Gerard R. Strecker
Attorney, Agent, or Firm—Finnegan, Henderson, Farabow, Garrett and Dunner

[57] ABSTRACT

This invention relates to an index signal generator for a magnetic disk drive. The peak of the magnetic field from the magnet during rotation in association with the rotation of the spindle is detected by a peak detecting circuit. A detection pulse signal output circuit outputs a detection pulse signal synchronously with the peak of the magnetic field on the basis of the result of the detection of the peak detecting circuit. A memory for storing adjustment data is provided. This adjustment data corresponds to the time after the detection pulse signal was output until the index pulse signal is output. An index pulse signal output circuit outputs the index pulse signal on the basis of the adjustment data stored in the memory after an expiration of a period of time corresponding to the adjustment data from the output of the detection pulse signal.

3 Claims, 3 Drawing Sheets

FIG. 4A H 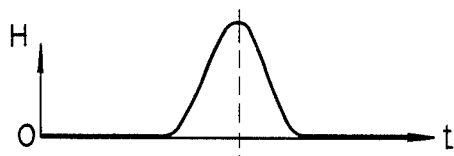
FIG. 4B V1 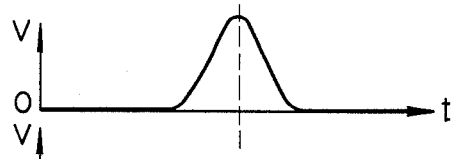
FIG. 4C V2 
FIG. 4D VA 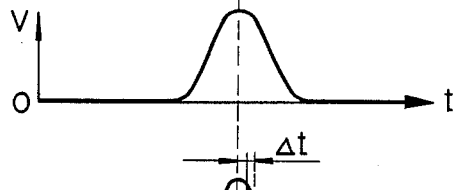
FIG. 4E VI 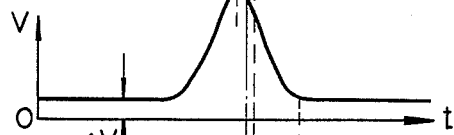
FIG. 4F VD 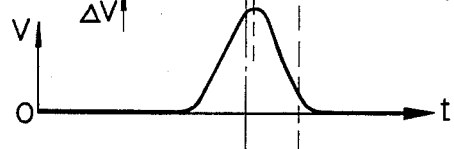
FIG. 4G DP 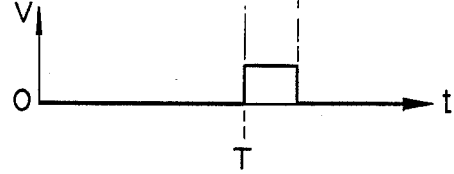

FIG. 6
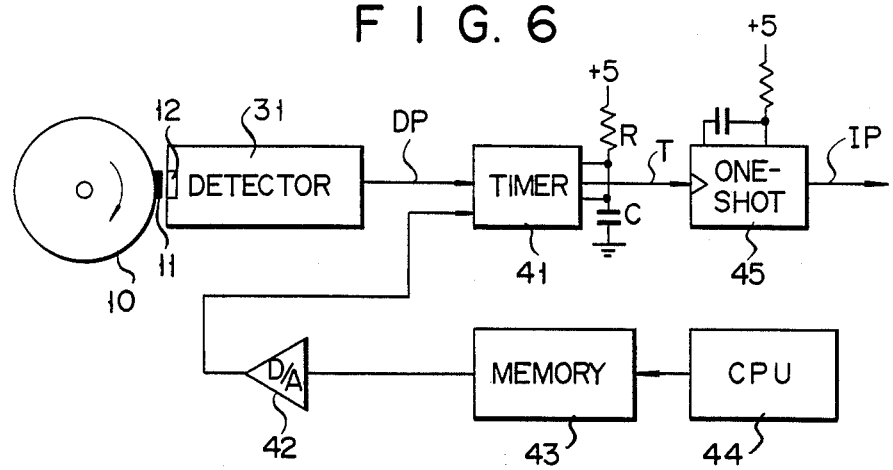
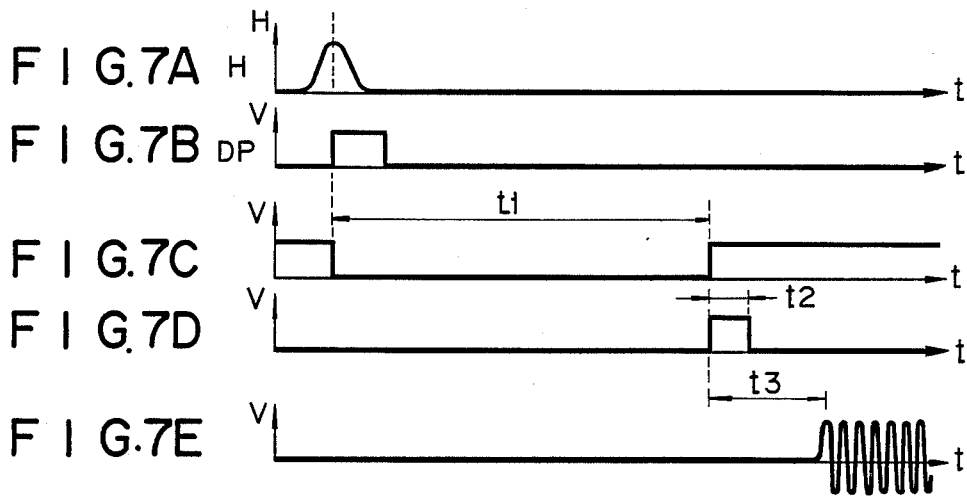
FIG. 8
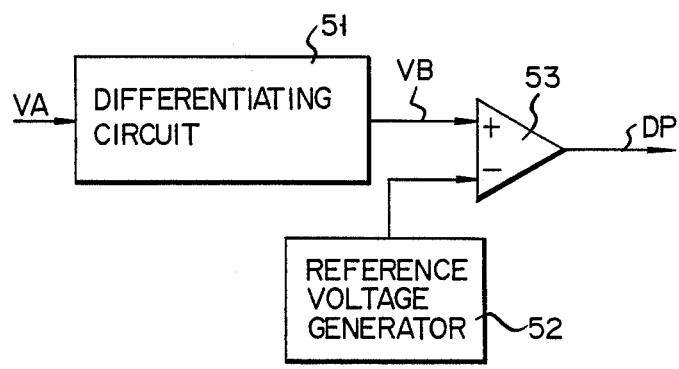

APPARATUS FOR GENERATING INDEX SIGNALS, FOR USE IN MAGNETIC RECORDING/REPRODUCING APPARATUSES

BACKGROUND OF THE INVENTION

The present invention relates to an improvement of a circuit for detecting an index of a magnetic recording medium and outputting a predetermined index signal in, for example, a floppy disk apparatus.

In prior 5-inch or 8-inch floppy disk apparatus, an index hole is formed in magnetic recording medium (hereinafter, referred to as a disk) to define the start point for recording/reproduction. The index signal output apparatus optically detects the index hole and generates an index pulse signal each time the disk rotates once.

On the other hand, in the 3.5-inch floppy disk apparatus which has recently been developed, the positions in the rotating direction of the spindle and disk are unconditional due to the relation of the chucking mechanism. Therefore, a method of detecting the index by detecting the rotating position of the spindle was developed. According to such an index detecting method, a detecting circuit using a magnetic sensor is ordinarily provided.

In this index detecting method, a magnet for the index is attached to a predetermined position of the spindle. The magnetic sensor measures the magnetic field generated by the magnet and outputs a corresponding signal. This signal is compared with a predetermined reference signal, so that a predetermined pulse signal (detection pulse signal) is output.

In the above index detecting circuit, when the ambient temperature changes, the magnetic field generated from the magnet varies, causing the timing of the generation of the detection pulse signal to become unstable. For example, when the ambient temperature rises, the magnetic field of the magnet decreases. The timing when the output of the magnetic sensor reaches a predetermined reference level is delayed. Thus, the generation of the detection pulse signal is also delayed. There is also a drawback due to a deviation in the timing of generation of the index signal from the expected timing.

The time period from after the index is detected until the origin of the data reaches the position of the head varies for every disk drive due to the difference of the attaching position of the magnet, the difference of the attachment of the magnetic sensor, the difference of the structure of the disk apparatus, and the like. On the other hand, the time interval from after the index signal is output until the origin of the data reaches the head position needs to be kept constant. Therefore, the time interval from the detection of the index until the generation of the index pulse signal needs to be adjusted for every disk drive. The conventional disk apparatus, therefore, is provided with a circuit to adjust the timing of generation of the index signal (i.e., index control circuit). This control circuit is conventionally comprised of a monostable multivibrator. The timing of generation of the index pulse signal is adjusted by adjusting a resistance value of a variable resistor for adjustment of a pulse width of an output pulse signal of the multivibrator.

The time interval from the output of the detection pulse signal until the origin of the data reaches the magnetic head position varies for every disk drive. Therefore, in the control circuit using the monostable multivibrator, a variable range of the variable resistor for adjustment of the pulse width needs to be set to a large value. Consequently, the timing of generation of the index pulse signal varies greatly in response to a slight change in value of the resistor for adjustment. Thus, there is a drawback in the use of the conventional control circuit because the timing of the generation of the index pulse signal is likely to vary after the pulse width has been adjusted due to the temperature, humidity, vibration, or the like. In association with this variation, there is also a drawback because the time interval from after the index pulse signal was output until the origin of the data reaches the magnetic head position is unstable.

SUMMARY OF THE INVENTION

It is an object of the present invention to provide an apparatus for outputting an index signal which can accurately output the index signal.

An index detector of this invention is comprised of
sensor means for detecting an intensity of a magnetic field which is applied and for outputting a signal of a signal level corresponding to the magnetic field intensity detected;

means for detecting the substantial peak of a change in the magnetic field on the basis of a signal which is output from the sensor means; and means for outputting a pulse signal in correspondence to the substantial peak of the magnetic field on the basis of the result of the detection of the means for detecting the peak.

Further, an index signal control circuit, according to this invention, is comprised of:

sensor means for detecting the rotation of a magnetic recording medium;

pulse signal output means for outputting at least one pulse signal each time the magnetic recording medium rotates once on the basis of a signal which is output from the sensor means;

memory means for storing predetermined adjustment data, this adjustment data corresponding to the time interval from the generation of the pulse signal by the pulse signal output means until the generation of an index pulse signal; and index pulse signal output means for outputting the index pulse signal after an expiration of the time period (t1) corresponding to the adjustment data from the generation of a pulse signal which is output from the pulse signal output means on the basis of the adjustment data stored in the memory means.

In the apparatus of the present invention, a detection pulse signal can be output at a constant timing, even when the magnetic field which is applied from magnet 11 serving as an index to the sensor means changes due to, for example, a change in ambient temperature.

The output timing of the index pulse signal is controlled by the adjustment data stored in the memory means. The adjustment data does not vary so long as there is no malfunction of the memory means due to an influence of the external environment of the floppy disk apparatus. After the output timing of the index pulse signal has been adjusted initially, the output timing of the index pulse signal does not vary due to influences of the external environment and the like. The index pulse signal can be always derived at the adjusted timing. Consequently, in a floppy disk apparatus and like apparatus which require compatibility of disks, after a constant time period has elapsed from the generation of the index pulse signal, the magnetic head reaches the posi-

BRIEF DESCRIPTION OF THE DRAWINGS

FIGS. 4A to 4G and 5 are signal waveform diagrams for explaining the operation of the circuit shown in FIG. 3;

FIG. 6 is a circuit diagram of an index control circuit according to an embodiment of the invention;

FIGS. 7A to 7E are signal waveform diagrams for explaining the operation of the circuit shown in FIG. 6; and FIG. 8 is a circuit diagram showing embodiment of an apparatus for detecting the peak of the magnetic field which is applied to a sensor.

DETAILED DESCRIPTION OF THE INVENTION

An index signal output apparatus according to an embodiment of the present invention will be described hereinbelow with reference to the drawings.

Figure 1:
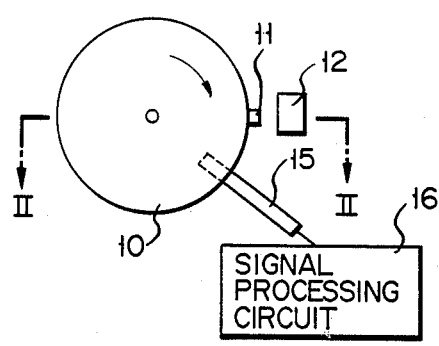
FIG. 1 is a diagram for explaining the relationship between the magnet serving as an index and the magnetic sensor in order to explain an index signal output apparatus according to an embodiment of the present invention.
Figure 2:
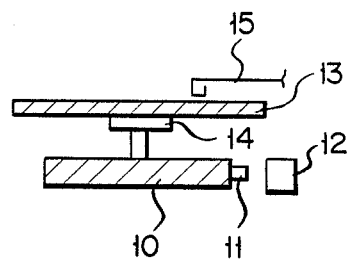
FIG. 2 is a cross sectional view taken along the line II—II in FIG. 1.

First, as shown in FIGS. 1 and 2, magnet 11 serving as an index is attached at a predetermined position of spindle 10. Magnetic sensor 12, for detecting the magnetic field from magnet 11, is arranged at the position corresponding to spindle 10. Magnetic disk 13 is fastened to the surface of chucking hub 14 connected to spindle 10 and rotated by spindle 10. When spindle 10 rotates and magnet 11 moves near the position which faces magnetic sensor 12, magnetic field H, which varies as shown in FIG. 4A, is applied to magnetic sensor 12.

Magnetic head 15 is provided in a contact relationship with disk 13. A data signal and the like detected by magnetic head 15 are supplied to a well-known signal processing circuit 16 (including a data processing circuit and a control circuit, for example) and subjected to predetermined pulse signal processes.

Figure 3:
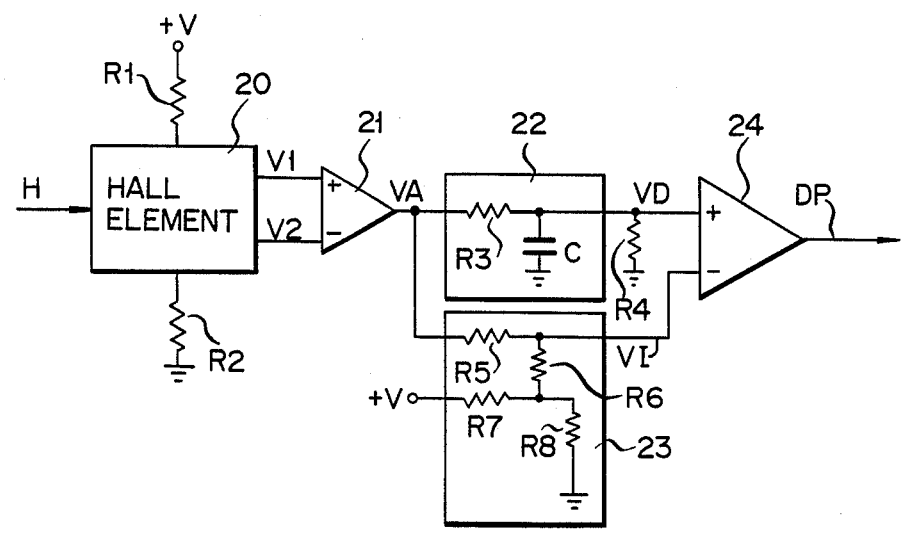
FIG. 3 is a circuit diagram of an index detecting circuit according to an embodiment of the invention.

The operation of an index detecting circuit including sensor 12 will now be described with reference to FIGS. 3 to 4G. This index detecting circuit detects magnetic field H from magnet 11 and outputs a predetermined signal at a predetermined time interval for each rotation of the disk.

A Hall element 20, for example, is used as magnetic sensor 12. Electric power is supplied from a power source to Hall element 20 through a resistor R1 and Hall element 20 is grounded through a resistor R2. An output signal V1 of Hall element 20 is supplied to a positive input terminal of a differential amplifier 21. Output signal V2 of Hall element 20 is supplied to a negative input terminal of amplifier 21. There is a mutually inversed relationship between signals V1 and V2 with respect to a predetermined reference voltage. Output signal VA of amplifier 21 is input to delay circuit 22. Delay circuit 22 may have a well-known construction consisting of, for example, a resistor R3 and capacitor C. An output signal VD of delay circuit 22 is supplied to a positive input terminal of comparator 24. Resistor R4 is connected between the positive input terminal of comparator 24 and the ground. Output signal VA of amplifier 21 is also supplied to reference voltage generating circuit 23. Reference voltage generating circuit 23 adds a constant bias voltage to output signal VA of amplifier 21 and supplies it as reference signal VI to a negative input terminal of comparator 24. Generating circuit 23 is comprised of a resistor R5 having one end connected to an output terminal of amplifier 21 and the other end connected to the negative input terminal of comparator 24, a resistor R6 having one end connected to the negative input terminal of comparator 24, a resistor R7 having one end connected to one end of resistor R8, a predetermined power voltage applied to the other end of resistor R7, and a ground voltage applied to the other end of resistor R8. The other end of resistor R6 is connected to a connecting point of resistors R7 and R8.

An output signal of comparator 24 is supplied as an output signal DP (detection pulse signal) of the index detecting circuit to timer 41 of a control circuit, which will be explained later.

The operation of the index detecting circuit shown in FIG. 3 will now be described. First, when spindle 10 rotates as shown in FIG. 1 and magnet 11 approaches Hall element 20, magnetic field H which is applied to Hall element 20 by magnet 11 changes as shown in FIG. 4A. Hall element 20 outputs voltage signals V1 and V2 which are proportional (or correspond) to applied magnetic field H. Output voltage signals V1 and V2 of Hall element 20 are differentially amplified by amplifier 21. Therefore, output signal VA of differential amplifier 21 is generated as shown in FIG. 4D. Signal VA is supplied to reference voltage generating circuit 23. Output signal VI of generating circuit 23 becomes the signal VA having a constant bias voltage $\Delta V$ added as shown in FIG. 4E. When the amplitude of signal VA is approximately equal to a few volts, bias voltage $\Delta V$ is set to, for example, about 40 to 600 mV. This signal VI is supplied to the magnetic input terminal of comparator 24.

Signal VA is also supplied to delay circuit 22 which outputs signal VD which is equal to signal VA delayed by a predetermined period of time $\Delta T$ as shown in FIG. 4F. This signal VD is supplied to the positive input terminal of comparator 24. Delay time $\Delta T$ has a value so small that it can be ignored, as compared with the pulse width of signal VA. For example, in the case where the pulse width of signal VA is equal to approximately a few milliseconds, delay time $\Delta T$ is set to approximately 100 nanoseconds.

Comparator 24 outputs a signal at a high (H) level for the period of time when the voltage level of delay signal VD is above the voltage level of reference voltage signal VI. Namely, when the voltage level of delay signal VD coincides with the voltage level of reference voltage signal VI, comparator 24 outputs the H-level signal. After an expiration of a predetermined time, when the voltage level of delay signal VD again coincides with the voltage level of reference signal VI, comparator 24 outputs a signal at a low (L) level. Thus, comparator 24 outputs a detection pulse signal DP as shown in FIG. 4G.

Figure 5:
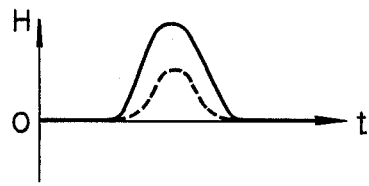

In this embodiment, since delay time $\Delta T$ is relatively short, detection pulse signal DP is output substantially synchronously with the peaks of output signals V1 and V2 of Hall element 20. Namely, this detecting circuit detects the peak of magnetic field H which is applied from magnet 11 to Hall element 20 and outputs detection pulse signal DP substantially in synchronism with this peak. Therefore, for example, even if magnetic field H from magnet 11 decreases, for example, from the state as indicated by a solid line in FIG. 5 to the state as indicated by a broken line in FIG. 5 due to a change in ambient temperature, the detecting circuit can output the detection pulse signal at a constant timing. This is an improvement over the conventional method whereby a constant reference voltage is compared with an output signal of the sensor, and wherein the output timing of the detection pulse signal varies due to changes in temperature and the like. In this embodiment, the voltage equal to a constant bias voltage $\Delta V$ added to signal VA is used as a reference voltage. Therefore, there is no fear of malfunction of the detecting circuit due to a slight change in signal VA, noise, and the like. The reliability of the detecting circuit is further improved.

The index detecting circuit according to the embodiment can remarkably reduce the error of timing for generation of detection pulse signal DP. By presetting the relative position of magnet 11 and Hall element 20 (magnetic sensor), the detection pulse signal and an index pulse signal IP based thereon can be output at the stable timing.

A circuit (index control circuit) for outputting the index pulse signal on the basis of detection pulse signal DP output from the index detecting circuit will now be described. First, a construction of the index control circuit according to the embodiment will be described with reference to FIG. 6.

In FIG. 6, the same parts and components as those shown in FIG. 1 are designated by the same reference numerals and their descriptions are omitted. Detection pulse signal DP output from detecting circuit 31 (having the construction shown in FIG. 3) is supplied to a trigger terminal of timer 41. On one hand, an output signal of D/A converter 42 is supplied to a control signal input terminal of timer 41. D/A converter 42 converts adjustment data (which will be explained hereinafter) stored in a memory 43 (for example, RAM or ROM having a backup power source) into an analog voltage signal and outputs it. Memory 43 is connected to a CPU 44. CPU 44 generates the control data corresponding to the generation timing of the index pulse signal which is preset and stores this adjustment data into memory 43. After the adjustment data is stored into memory 43, CPU 44 may be disconnected from memory 43. As an alternative, the CPU for controlling the whole magnetic disk apparatus may be used as it is.

Timer 41 is provided with, e.g., a comparator, and counts time with respect to the voltage corresponding to the C-R time constants which are determined by a resistor and a capacitor connected to this timer and the voltage of the timing control signal from D/A converter 42. Practically speaking, for example, model 555 of an IC and the like may be used as timer 41.

Time signal T output from timer 41 is supplied to a trigger terminal of a monostable multivibrator (one-shot) 45. Monostable multivibrator 45 outputs a pulse signal of pulse width T2 synchronously with the leading edge of a signal which is input to the trigger terminal.

The operation of the index control circuit with the construction shown in FIG. 6 will now be described with reference to FIGS. 7A to 7E.

CPU 44 generates the adjustment data on the basis of a preset period of time t3. This time t3 is equal to the time interval from the generation of index pulse signal IP until the origin of the data reaches the position of magnetic head 15 (i.e., until the generation of the reproduced waveform of the readout signal from magnetic head 15). CPU 44 stores the adjustment data into memory 43. The adjustment data can be easily obtained in the following manner. Each time the floppy disk is driven, the time interval (t1+t3) from after detection pulse signal DP is output until magnetic head 15 reaches the origin of the data is measured. Preset time t3 is subtracted from this measured time interval (t1+t3) to obtain time T1. Therefore, time t3 is kept constant although time t1 changes each time the disk is driven. CPU 44 outputs the data to D/A converter 42 such that D/A converter 42 outputs the control signal equal to the calculated time t1 as the count time of timer 41. Then, CPU 44 stores this data into memory 43.

Similar to the case of FIG. 4A, when magnetic field H, which is applied from magnet 11 to sensor 12, changes as shown in FIG. 7A, detecting circuit 31 outputs detection pulse signal DP. Also, detecting circuit 31 outputs detection pulse signal DP substantially synchronously with the peak of the change in magnetic field H as shown in FIG. 7B. Timer 41 is activated by pulse signal DP. Timer 41 performs the time count corresponding to the voltage level of the control signal which is output from D/A converter 42. D/A converter 42 converts the adjustment data stored in memory 43 into the analog control signal and outputs it to timer circuit 41. Thus, timer circuit 41 outputs signal T which rises after a time has elapsed from the leading edge of pulse signal DP as shown in FIG. 7C. As mentioned above, time t1 is determined by CR time constants, which in turn are determined by the values of the resistor and capacitor connected to timer circuit 41, and by the level of the timing control signal (in other words, the value of the adjustment data). Monostable multivibrator 45 is triggered at the leading edge of timer signal T and outputs index pulse signal IP having a preset pulse width t2. Thus, after an expiration of a predetermined time t3 from the generation of index pulse signal IP, the origin of the data on the track reaches the position of the magnetic head.

In this manner, a time t1 is preadjusted on the basis of the adjustment data generated by CPU 44. Thus, the generation timing of index pulse signal IP can be adjusted and time t3 can be made constant. As a result, this floppy disk apparatus can accurately execute the data reading and writing operations from the origin of the data on the track of disk 13.

The generation timing of index pulse signal IP is controlled by the adjustment data stored in memory 43. The adjustment data does not vary so long as no malfunctions of memory 43 occur. Therefore, after the generation timing of index pulse signal IP has been adjusted initially, the variation in the generation timing of signal IP does not occur in spite of the influences of the external environment and the like. Consequently, index pulse signal IP can always be output at the adjusted timing. Thus, in the floppy disk apparatus and the like which need the compatibility of disks, the magnetic head reaches the origin of the data after a constant period of time has elapsed from the generation of index pulse signal IP and the secure reading and writing operations can be executed.

It is not always necessary to combine and use the index detecting circuit and index control circuit as described in the above embodiment. The index detecting circuit of the present invention and a conventional index control circuit may be also combined and used.

Also, a conventional index detecting circuit and the index control circuit of the present invention may be also combined and used. Output pulse signal DP of the detecting circuit may be also directly used as the index pulse signal.

The index detecting circuit according to the present embodiment detects the peak of the change in magnetic field H which is applied from magnet 11 to sensor 12 and outputs detection pulse signal DP synchronously with this peak detection. The circuit shown in FIG. 3 is useful since it has a simple construction and can, nonetheless, detect the peak. However, the invention is not limited to this constitution. It is also possible to delay the signal to which the bias voltage was added and to compare this delayed signal with signal VA. In addition, a value of the bias voltage is not limited to the positive level. For example, the bias voltage may be set to a negative level. Also, as shown in FIG. 8, the signal from sensor 20 is supplied to a differentiating circuit 51 and differentiated. The differentiation signal and a signal having a predetermined reference level from a reference voltage generator 52 are supplied to a comparator 53. An output of comparator 53 may also be used as the detection pulse signal. Since the differentiated value of the change in the magnetic field is zero, the peak portion of the change in the magnetic field can be also detected by use of such a construction. In this case, it is desirable to set the reference level to be substantially equal to zero. However, to remove influences of noise and the like, the voltage level, to which a slight bias voltage is added, may be also set as the reference level.

In the present invention, detection pulse signal DP is output synchronously with the peak of the intensity of the magnetic field; however, pulse signal DP may be also output at the timing which is deviated from the peak by a predetermined time on the basis of the position of the peak.

In the embodiment described above, a situation where the intensity of magnetic field H changes on the side of the positive level and the peak is the highest value (maximum value) has been shown. The peak can be also detected by a similar construction in the case where the intensity of magnetic field H changes on the negative level side or where the peak of the change in the magnetic field is the lowest value (minimum value).

In the circuit shown in FIG. 6, timer 41 was used. However, the invention is not limited to this construction. For instance, it is also possible to use a delay circuit for delaying pulse signal DP on the basis of the signal level from D/A converter 42. In addition, the data stored in memory 42 can be directly received using a programmable counter, and the count value of this counter can be also directly and digitally changed.

What is claimed is:

1. An index detection circuit for a magnetic disk apparatus for detecting the peak of a magnetic field and for outputting an index detection pulse substantially synchronously with the peak, comprising:

means for supporting and rotating a magnetic disk recording medium;

index means, comprised of a magnetic material, being arranged at a predetermined position of said supporting and rotating means and rotating in association with the rotation of said rotating means, for generating a magnetic field;

sensor means, provided at a position adjacent to said supporting and rotating means, for outputting a signal corresponding to the intensity of the magnetic field generated by said index means, said magnetic field varying in association with the rotation of said index means;

delay means for receiving and delaying the output signal of said sensor means by a predetermined period of time;

means for adding a bias voltage to the delayed signal from said delay means and to the output signal of said sensor means;

first means for receiving the output signal of said sensor means and the output signal of said delay means, said first receiving means comparing the output signal of said sensor means and the delayed signal and outputting the index detection pulse substantially synchronously with the peak of the magnetic field at a time when the levels of the output signal and the delayed signal coincide with each other;

means for storing predetermined time data;

second means for receiving the index detection pulse and the predetermined time data and for detecting an elapsed time period defined by the predetermined time data, based on the output of the index detection pulse; and third means for receiving the results from said second receiving and detecting means and for outputting an index pulse after said elapsed time period.

2. An index detection circuit for a magnetic disk apparatus for detecting the peak of a magnetic field and for outputting an index detection pulse substantially synchronously with the peak, comprising:

means for supporting and rotating a magnetic disk recording medium;

index means, comprised of a magnetic material, being arranged at a predetermined position of said supporting and rotating means and rotating in association with the rotation of said rotating means, for generating a magnetic field;

sensor means, provided at a position adjacent to said supporting and rotating means, for outputting a signal corresponding to the intensity of the magnetic field generated by said index means, said magnetic field varying in association with the rotation of said index means;

means for differentiating the output signal of said sensor means one time;

means for comparing the output signal of said differentiating means and a signal of zero level and for outputting an index detection pulse when the level of the output signal coincides with the zero level signal;

means for storing predetermined time data;

first means for receiving the index detection pulse and the predetermined time data and for detecting an elapsed time period defined by the predetermined time data which varies based on the output of the index detection pulse; and second means for receiving the result from said first receiving and detecting means and for outputting an index pulse after said elapsed time period.

3. An index detection circuit for a magnetic disk apparatus for detecting the peak of a magnetic field and for outputting an index detection pulse substantially synchronously with the peak, comprising:

means for supporting and rotating a magnetic disk recording medium;

index means, comprised of a magnetic material, being arranged at a predetermined position of said rotating means and rotating in association with the rotation of said rotating means, for generating a magnetic field;
sensor means, provided at a position adjacent to said rotating means, for outputting a signal corresponding to the intensity of the magnetic field generated by said index means, said magnetic field varying in association with the rotation of said index means;
means for detecting the peak of the output signal of said sensor means;

means for outputting an index detection pulse synchronously with the detection of the peak;
means for storing predetermined time data;
first means for receiving the index detection pulse and the predetermined time data and for detecting an elapsed time period defined by the predetermined time data based on the output of the index detection pulse; and
second means for receiving the result from said first receiving and detecting means and for outputting an index pulse after said elapsed time period.

* * * * *